US011935464B2

(12) United States Patent
Cok

(10) Patent No.: US 11,935,464 B2
(45) Date of Patent: Mar. 19, 2024

(54) MULTI-ROW BUFFERING FOR ACTIVE-MATRIX CLUSTER DISPLAYS

(71) Applicant: X Display Company Technology Limited, Dublin (IE)

(72) Inventor: Ronald S. Cok, Rochester, NY (US)

(73) Assignee: X Display Company Technology Limited, Dublin (IE)

( * ) Notice: Subject to any disclaimer, the term of this patent is extended or adjusted under 35 U.S.C. 154(b) by 0 days.

(21) Appl. No.: 18/089,435

(22) Filed: Dec. 27, 2022

(65) Prior Publication Data

US 2023/0351945 A1 Nov. 2, 2023

Related U.S. Application Data

(63) Continuation of application No. 17/730,593, filed on Apr. 27, 2022, now Pat. No. 11,568,803.

(51) Int. Cl.
*G09G 3/32* (2016.01)
*G09G 3/20* (2006.01)

(52) U.S. Cl.
CPC ............ *G09G 3/32* (2013.01); *G09G 3/2092* (2013.01); *G09G 2300/06* (2013.01); *G09G 2310/0286* (2013.01); *G09G 2320/064* (2013.01); *G09G 2320/0686* (2013.01)

(58) Field of Classification Search
CPC ........................................................ G09G 3/32
See application file for complete search history.

(56) References Cited

U.S. PATENT DOCUMENTS

| | | | |
|---|---|---|---|
| 5,550,066 | A | 8/1996 | Tang et al. |
| 7,622,367 | B1 | 11/2009 | Nuzzo et al. |
| 8,207,954 | B2 | 6/2012 | Cok et al. |
| 8,506,867 | B2 | 8/2013 | Menard |
| 8,722,458 | B2 | 5/2014 | Rogers et al. |
| 9,520,537 | B2 | 12/2016 | Bower et al. |
| 9,640,108 | B2 | 5/2017 | Cok et al. |
| 9,928,771 | B2 | 3/2018 | Cok |
| 9,930,277 | B2 | 3/2018 | Cok |
| 10,360,846 | B2 | 7/2019 | Cok et al. |
| 10,453,826 | B2 | 10/2019 | Raymond et al. |
| 10,832,609 | B2 | 11/2020 | Rotzoll et al. |
| 11,568,803 | B1 | 1/2023 | Cok |
| 2002/0041264 | A1 | 4/2002 | Quanrud |
| 2008/0252625 | A1 | 10/2008 | Liao et al. |
| 2016/0093600 | A1 | 3/2016 | Bower et al. |
| 2018/0197471 | A1 | 7/2018 | Rotzoll et al. |
| 2018/0323180 | A1 | 11/2018 | Cok |
| 2022/0122519 | A1 | 4/2022 | Bower et al. |

*Primary Examiner* — Gustavo Polo

(74) *Attorney, Agent, or Firm* — Choate, Hall & Stewart LLP; Michael D. Schmitt

(57) ABSTRACT

An active-matrix display with passive-matrix pixel clusters includes pixel clusters each having a cluster controller and a display controller operable to provide pixel data to the cluster controllers. Each pixel cluster includes pixels disposed in an array of N rows (N>=2) and M columns (M>=1), (N+1) memory banks, and a cluster controller operable to control the pixels and memory banks. Each memory bank is operable to store pixel data for a row of pixels. The cluster controller is operable to input pixel data for a row of pixels and store the pixel data in an input memory bank of the (N+1) memory banks and output stored pixel data from one or more output memory banks of the (N+1) memory banks that are not the input memory bank to control corresponding one or more rows of pixels.

26 Claims, 13 Drawing Sheets

FIG. 12
Bank 0
Bank 1
Bank 2
Bank 3
Bank 4
60
52
34
44
L=1 R0A X X X X LD0 BS1-4
L=2 R0A R1A X X X LD1 BS0,2-4
L=3 R0A R1A R2A X X LD2 BS0-1,3-4
L=4 R0A R1A R2A R3A X LD3 BS0-2,4
L=5 R0A R1A R2A R3A R0B LD4 BS0-3
L=6 R1B R1A R2A R3A R0B LD0 BS1-4
L=7 R1B R2B R2A R3A R0B LD1 BS0,2-4
L=8 R1B R2B R3B R3A R0B LD2 BS0-1,3-4
L=9 R1B R2B R3B R0C R0B LD3 BS0-2,4
L=10 R1B R2B R3B R0C R1C LD4 BS0-3
L=11 R2C R2B R3B R0C R1C LD0 BS1-4
L=12 R2C R3C R3B R0C R1C LD1 BS0,2-4
L=13 R2C R3C R0D R0C R1C LD2 BS0-1,3-4
L=14 R2C R3C R0D R1D R1C LD3 BS0-2,4
L=15 R2C R3C R0D R1D R2D LD4 BS0-3
L=16 R3D R3C R0D R1D R2D LD0 BS1-4
L=17 R3D R0E R0D R1D R2D LD1 BS0,2-4
L=18 R3D R0E R1E R1D R2D LD2 BS0-1,3-4
L=19 R3D R0E R1E R2E R2D LD3 BS0-2,4
L=20 R3D R0E R1E R2E R3E LD4 BS0-3
L=21 R0F R0E R1E R2E R3E LD4 BS0-3

MULTI-ROW BUFFERING FOR ACTIVE-MATRIX CLUSTER DISPLAYS

PRIORITY APPLICATION

This application is a continuation of U.S. Pat. No. 11,568,803, the content of which is hereby incorporated by reference herein in its entirety.

FIELD OF THE DISCLOSURE

The present disclosure relates to display architectures having active-matrix controllers for pixel groups. The pixels in each group are controlled using passive-matrix control.

BACKGROUND OF THE DISCLOSURE

Flat-panel displays are widely used in conjunction with computing devices, in portable electronic devices, and for entertainment devices such as televisions. Such displays typically employ an array of pixels distributed over a display substrate to display images, graphics, or text. In a color display, each pixel includes light emitters that emit light of different colors, such as red, green, and blue. For example, liquid crystal displays (LCDs) employ liquid crystals to block or transmit light from a backlight behind the liquid crystals and organic light-emitting diode (OLED) displays rely on passing current through a layer of organic material that glows in response to the current. Displays using inorganic light-emitting diodes (LEDs) as pixel elements are also in widespread use for outdoor signage and have been demonstrated in a 55-inch television.

Displays are typically controlled with either a passive-matrix (PM) control scheme employing only electronic control circuitry external to the pixel array or an active-matrix (AM) control scheme employing electronic control circuitry in the pixels on the display substrate and associated with each light-emitting element. Both OLED displays and LCDs using passive-matrix control and active-matrix control are available. An example of such an AM OLED display device is disclosed in U.S. Pat. No. 5,550,066.

In a PM-controlled display, each pixel in a row is stimulated to emit light at the same time while the other rows do not emit light and each row is sequentially activated at a high rate to provide the visual illusion that all of the rows simultaneously emit light. In contrast, in an AM-controlled display, data is concurrently provided to and stored in pixels in a row and the rows are sequentially selected to load the data in the selected row. Each pixel emits light corresponding to the stored data when pixels in other rows receive data so that all of the rows of pixels in the display emit light at the same time, except possibly the row loading pixels. In such AM systems, the row activation rate can be much slower than in PM systems, for example divided by the number of rows. Control of the light-emitting elements is usually provided through a data signal line (column-data line), a select signal line (row-select line), a power connection, and a ground connection. Active-matrix elements therefore require circuitry in each pixel.

Typically, each display sub-pixel (e.g., light emitter) is controlled by one control element, and each control element includes at least one transistor. For example, in a simple active-matrix organic light-emitting diode (OLED) display, each control element includes two transistors (a select transistor and a power driving transistor) and one capacitor for storing a charge specifying the luminance of the light emitter. Each OLED element employs an independent control electrode connected to the power transistor and a common electrode. In contrast, an LCD typically uses a single transistor to control each pixel. Such circuits can be expensive and require significant area on a display substrate.

U.S. Pat. No. 8,207,954 filed Nov. 17, 2008, entitled Display Device with Chiplets and Hybrid Drive by Cok et al. describes a display device comprising a two-dimensional array of pixels associated into a plurality of pixel groups. A separate set of group row electrodes and group column electrodes are connected to pixels in each pixel group and are controlled by two or more chiplets within the pixel array. The chiplets have storage elements storing a value representing a desired luminance for each pixel.

There remains a need for display systems that provide improved circuit efficiency and performance.

SUMMARY

The present disclosure includes, among various embodiments, an active-matrix display with passive-matrix pixel clusters comprising pixel clusters and a display controller. Each pixel cluster comprises (i) pixels disposed in an array of N rows and M columns, wherein N is no less than two and M is no less than one, (ii) (N+1) memory banks, each memory bank operable to store pixel data for a row of the pixels, and (iii) a cluster controller operable to control the pixels and the (N+1) memory banks. The display controller is operable to provide pixel data to the cluster controller of each of the pixel clusters. For each of the pixel clusters, the cluster controller is operable to (i) input pixel data for a row of the pixels and store the pixel data in an input memory bank of the (N+1) memory banks and (ii) output stored pixel data from one or more output memory banks of the (N+1) memory banks that are not the input memory bank to control corresponding one or more rows of the pixels. In some embodiments, a pixel cluster can comprise exactly or only (N+1) memory banks. In some embodiments, a pixel cluster comprises fewer than 2N memory banks. In some embodiments, each pixel cluster comprises (N+1) (e.g., at least (N+1) and fewer than 2N) or exactly (N+1) memory banks for each color of light emitted by the display. A memory bank can store pixel data for only one color or can store pixel data for all of the colors of light emitted by the display. Thus, if memory banks in a display store pixel data for all of the colors of light emitted by the pixels (e.g., red, green, blue, and optionally yellow), then each pixel cluster can comprise (N+1) (e.g., at least (N+1) and fewer than 2N) or exactly (N+1) memory banks. If memory banks in a display store pixel data for only one color of light emitted by the pixels, then each pixel cluster can comprise (N+1)*L (e.g., at least (N+1)*L and fewer than 2N*L) or exactly (N+1)*L memory banks, where L is the number of colors emitted by the pixels (e.g., red, green, blue, and optionally yellow).

In some embodiments, the display controller provides active-matrix control to the pixel clusters. In some embodiments, the cluster controller provides passive-matrix control to the pixels in the pixel cluster. In some embodiments, for each of the pixel clusters, the cluster controller provides active-matrix control to the pixels in the pixel cluster.

According to some embodiments of the present disclosure, for each of the pixel clusters, the pixels in each pixel cluster are adjacent to each other so that no pixel from any other pixel cluster is disposed between the pixels in the pixel cluster.

For each of the pixel clusters, the cluster controller can be operable to successively output stored pixel data from two or more output memory banks of the (N+1) memory banks. For each of the pixel clusters, the cluster controller can be operable to input pixel data at an input rate and output pixel data at an output rate. The output rate can be greater than the input rate. The display controller can provide pixel data to the pixel clusters at irregular intervals. For each of the pixel clusters, the cluster controller can control the pixels without a blanking interval. For each of the pixel clusters, the cluster controller can control the pixels in the pixel cluster independently of any other pixel cluster.

The display controller can provide rows of pixel data for sequential image frames to one or more of the pixel clusters in alternating forward and reverse row orders.

According to some embodiments, for each of the pixel clusters, the pixel data is digital data. In some embodiments, for each of the pixel clusters, the cluster controller controls the pixels with pulse width modulation.

The pixels in each cluster can be or comprise light emitters that are inorganic micro-light-emitting diodes. Each of the pixels can comprise one or more inorganic micro-light-emitting-diodes and each of the one or more inorganic micro-light-emitting-diodes can have a length and a width each no greater than two hundred, one hundred, fifty, twenty, or ten microns or a thickness no greater than one hundred, fifty, twenty, ten, five, or two microns.

For each of the pixel clusters, the (N+1) memory banks can comprise one or more shift registers or one or more SRAMs or DRAMs.

In some embodiments of the present disclosure, for each of the pixel clusters, the cluster controller comprises the (N+1) memory banks. In some embodiments of the present disclosure, for each of the pixel clusters, the cluster controller comprises a load-select circuit, a bank-select circuit, and a row-select circuit.

According to embodiments of the present disclosure, a pixel cluster can comprise pixels disposed in an array of N rows and M columns, wherein N is no less than two and M is no less than one, (N+1) memory banks, each of the (N+1) memory banks operable to store pixel data for a row of the pixels, and a cluster controller operable to control the pixels and memory banks. The cluster controller can be operable to control the pixels and the (N+1) memory banks to (i) input pixel data for a row of the pixels and store the pixel data in an input memory bank of the (N+1) memory banks and (ii) output stored pixel data from one or more output memory banks of the (N+1) memory banks that are not the input memory bank to control corresponding one or more rows of the pixels. The cluster controller can be operable to input pixel data at the same time as output stored pixel data.

Some embodiments of the present disclosure comprise a cluster substrate. The pixels can be disposed on the cluster substrate and the (N+1) memory banks and the cluster controller can be independently disposed on or in the cluster substrate. The cluster substrate can be a semiconductor substrate. At least one of the (N+1) memory banks, the cluster controller, or at least one of the (N+1) memory banks and the cluster controller can be disposed in the cluster substrate. The pixel clusters can be disposed in an array on a display substrate.

A method of controlling a display can comprise providing first row pixel data to each of an array of pixel clusters in the display, each of the pixel clusters comprising rows of pixels and a cluster controller. For each of the pixel clusters, using the cluster controller to output the first row pixel data to a first row of the rows of pixels in each pixel cluster, and providing a second row pixel data to each of the array of pixel clusters. At least one of the pixel clusters can receive the second row of pixel data at a same time as the cluster controller of the at least of the one pixel clusters outputs the first row of pixel data. Each pixel cluster of two or more pixel clusters can receive the second row of pixel data at a same time as the cluster controller of each of the two or more pixel clusters outputs two or more rows of pixel data.

Some embodiments of the present disclosure comprise a row controller operable to provide row-select signals through row-select lines to rows of pixel clusters in the array of pixel clusters. (Row-select lines can be wires or traces on a display substrate, for example metal wires) on which the row controller and pixel clusters can be disposed. Each row-select line can be electrically separate and independently controlled by the row controller from every other of the row-select lines. The row controller can comprise row-control circuits that are serially connected, for example in a daisy chain. Each row-control circuit can comprise a token-passing circuit for passing a row-select token through the serially connected row-control circuits. The row controller can provide timing signals to the clusters. The row controller can comprise a single integrated circuit or multiple, electrically connected integrated circuits.

Some embodiments of the present disclosure comprise a column controller operable to provide column-data signals through column-data lines to columns of clusters in the array of clusters. (Column-data lines can be wires or traces on the display substrate, for example metal wires.) Each column-data line can be electrically separate and independently controlled by the column controller from every other of the column-data lines. The column controller can comprise column-control circuits that are serially connected, for example in a daisy chain. The column controller can comprise a single integrated circuit or multiple, electrically connected integrated circuits.

In some embodiments, each cluster comprises a cluster timing circuit. The timing circuits in each cluster can operate independently of the timing circuits in other clusters and can each generate time-dependent control signals for controlling the brightness of the light emitters in the cluster. Inorganic micro-light-emitting diodes can efficiently operate at a desired current density and can therefore operate efficiently at a constant current where pixel brightness is controlled by controlling the length of time that the inorganic micro-light-emitting diodes are operating (e.g., operated in a pulse width modulation mode).

Each of the pixels can comprise one or more inorganic micro-light-emitting-diodes (LEDs), for example red LEDs that emit red light, green LEDs that emit green light, and blue LEDs that emit blue light. Each of the inorganic micro-light-emitting-diodes can have a length and width no greater than 200 microns, no greater than 100 microns, no greater than 50 microns, no greater than 20 microns, or no greater than 10 microns and a thickness no greater than 100 microns, no greater than 50 microns, no greater than 20 microns, no greater than 10 microns, no greater than 5 microns, or no greater than 2 microns.

Embodiments of the present disclosure provide active and passive display control methods and architectures that enable improved control of large-substrate displays with a large number of pixels using fewer control circuits at a lower cost.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
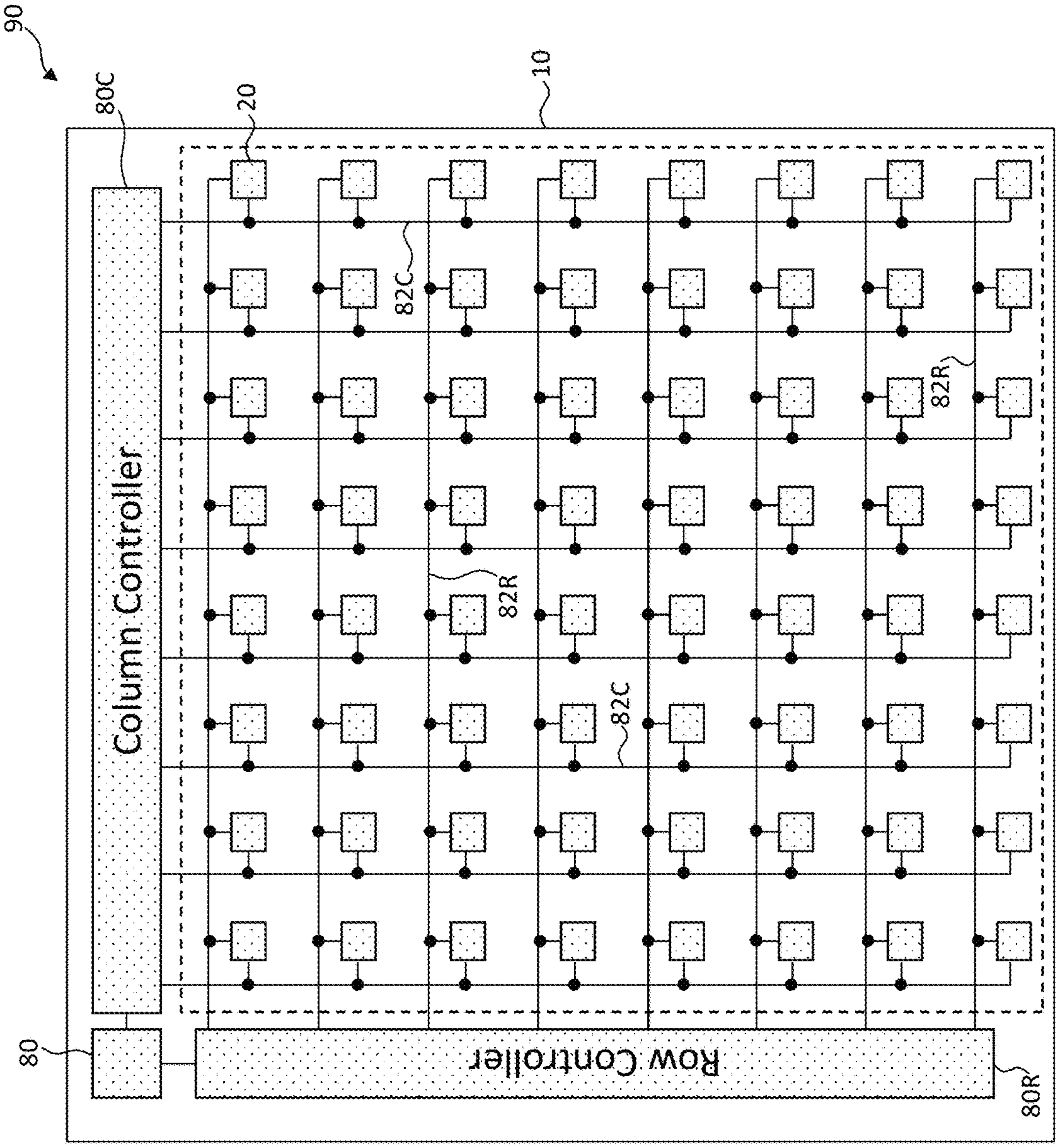
FIG. 1 is a schematic circuit diagram of a display according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF CERTAIN EMBODIMENTS

Embodiments of the present disclosure provide, inter alia, active- and passive-matrix display control methods and architectures that require fewer control circuits for flat-panel displays (e.g., large-substrate displays) with an array of pixels. The pixels can comprise one or more light emitters that are inorganic light-emitting diodes.

According to some embodiments of the present disclosure and as illustrated in FIG. 1, a flat-panel display 90 comprises a display substrate 10 and pixel clusters 20 distributed in an array of rows and columns over display substrate 10. Pixel clusters 20 can be, but are not necessarily, spatially separate and non-overlapping so that pixel clusters 20 are disposed in mutually exclusive areas on display substrate 10.

A column controller 80C can provide column signals (e.g., column-data signals) to clusters 20 through column wires 82C (e.g., column-data lines 82C). Each column wires 82C uniquely connects a column of clusters 20. A row controller 80R provides row signals (e.g., row-select signals) to clusters 20 through row wires 82R (e.g., row-select lines 82R). Each row wire 82R uniquely connects a row of clusters 20. Display controller 80 can control or comprise row controllers 80R and column controller 80C.

Figure 2:
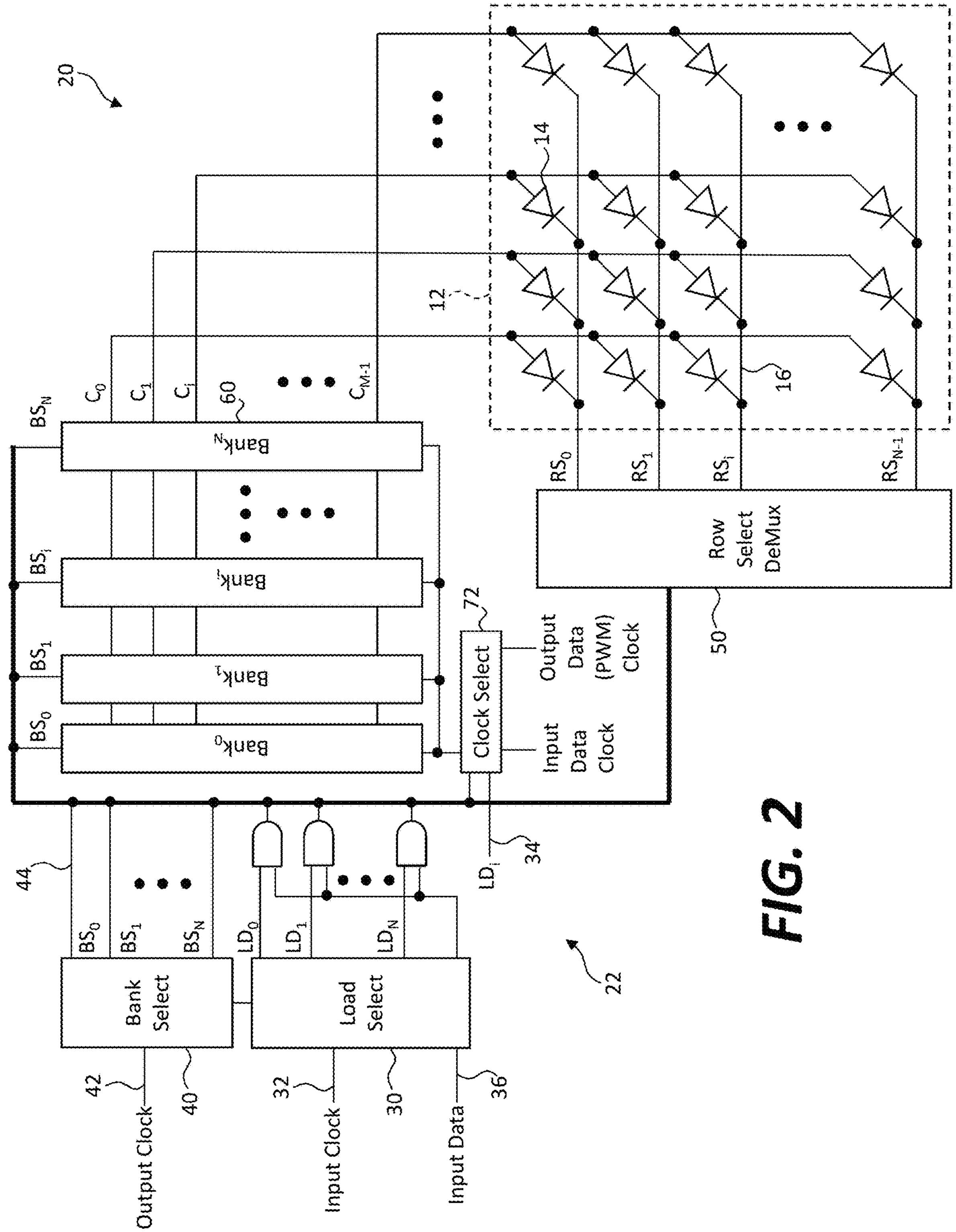
FIG. 2 is a schematic circuit diagram of a pixel cluster according to illustrative embodiments of the present disclosure.

As shown in FIG. 2, each pixel cluster 20 comprises a group of pixels 14. Each pixel 14 can comprise one or more light emitters 14 (e.g., a red emitter emitting red light, a green emitter emitting green light, and a blue emitter emitting blue light when provided with pixel data and suitable control, power, and ground signals forming a picture element or pixel in display 90) disposed in an array 12 of rows and columns in pixel cluster 20 on display substrate 10 or on a separate cluster substrate (not shown). Pixel data can specify the light output from pixels 14, for example using pulse-width modulation (PWM). Pixel data can comprise digital data. Light emitters 14 in pixel clusters 20 can define an array in a display area of display substrate 10. Thus, pixels 14 in each pixel cluster 20 are adjacent so that no pixel 14 from any other pixel cluster 20 is spatially disposed between the pixels 14 in pixel cluster 20. Pixel clusters 20 can be arranged with pixels 14 disposed in a regular array with a cluster controller 22 disposed between rows or columns of pixels 14. Such an arrangement of pixel clusters 20, light emitters 14, and cluster controllers 22 has been successfully laid out on a display substrate. In some embodiments, pixels 14 from different clusters 20 are interspersed, for example interdigitated. In some embodiments, cluster controller 22 is disposed outside (e.g., at a periphery) of the array of pixels 14 that it controls, for example between the array it controls and an array of pixels 14 included in a different pixel cluster 20.

In some embodiments, display controller 80 provides active-matrix control to clusters 20 and clusters 20 provide passive-matrix control to pixels 14 (e.g., light-emitters 14 such as inorganic micro-light-emitting diodes 14). According to embodiments of the present disclosure, an active-matrix display 90 with passive-matrix pixel clusters 20 comprises rows and columns of pixel clusters 20. Each pixel cluster 20 comprises pixels 14 disposed in an array 12 of N rows and M columns and a cluster controller 22 operable to control pixels 14. N is no less than two, for example three or four, and M is no less than one. Cluster controller 22 can comprise (N+1) memory banks 60, a load-select circuit 30, a bank-select circuit 40, and a row-select circuit 50. Each memory bank 60 is operable to store pixel data for a row of pixels 14 (e.g., light emitters 14). A display controller 80 (e.g., comprising row and column controllers 80R, 80C) is operable to provide pixel data to cluster controllers 22 of clusters 20. Cluster controller 22 is operable to input pixel data for a row of pixels 14 and store the pixel data in an input memory bank 60 of the (N+1) memory banks 60 and output stored pixel data from one or more output memory banks 60 of the (N+1) memory banks 60 that are not the input memory bank 60 to control the rows of pixels 14.

According to embodiments of the present disclosure, cluster controller 22 can be operable to input pixel data at an input rate and, at the same or different time, successively output stored pixel data from two or more output memory banks 60 of the (N+1) memory banks 60 at an output rate. The output rate can be different from the input rate and, in some embodiments, the output rate is greater than the input rate, for example an integral multiple such as two, four, eight, sixteen, or N. Cluster controller 22 can input pixel data and store pixel data in an input memory bank 60 at a time unrelated to or decoupled from a time at which pixel data is output from one or more output memory banks 60. Pixel data can be received by display controller 80 and can be input by cluster controllers 22 at arbitrary times or irregular intervals. In embodiments of the present disclosure, cluster controller 22 controls pixels 14 to emit light without a blanking interval, for example a blanking interval between the output of rows of pixel data or between image frames received by display controller 80 or any input or output time delay associated with pixel data input into a cluster 20 or receiving pixel data from display controller 80. Each pixel cluster 20 can control pixels 14 with cluster controller 22 independently of any other pixel cluster 20.

Input memory banks 60 can comprise any suitable memory storage device, e.g., a digital memory storage device such as a static random access memory (SRAM), a dynamic random access memory (DRAM), one or more registers, for example shift registers comprising flip flops such as a serial shift register, a parallel shift register, or a serial-in/parallel-out shift register.

Thus, embodiments of the present disclosure include a pixel cluster 20 comprising pixels 14 disposed in an array 12 of N rows and M columns, wherein N is no less than two and M is no less than one. (N+1) memory banks 60 are each operable to store pixel data for a row of pixels 14 and a cluster controller 22 is operable to control pixels 14 and memory banks 60. Cluster controller 22 is operable to (i) input pixel data for a row of pixels 14 and store the pixel data in an input memory bank 60 of the (N+1) memory banks 60 and (ii) output stored pixel data from one or more output memory banks 60 of the (N+1) memory banks 60 that are not the input memory bank 60 to control corresponding one or more rows of pixels 14. Thus, pixel data is input to an input memory bank 60 and output from one or more different output memory banks 60 at the same time, so that pixel data can be loaded into display 90 and clusters 20 at the same time as pixel data can be output from clusters 20 so that display 90 and clusters 20 do not have any blanking interval to load pixel data into display 90, thereby reducing or eliminating display 90 flickering and improving the appearance of image pixel data on display 90.

Accordingly, methods of the present disclosure for controlling a display 90 can comprise providing first row pixel data to each of a row of pixel clusters 20, each pixel cluster 20 comprising rows of pixels 14, outputting the first row pixel data to a first row of pixels 14 in each pixel cluster 20, and providing a second row pixel data to each of the row of pixel clusters 20. At least one pixel cluster 20 receives the second row of pixels 14 at the same time as the at least one pixel cluster 20 outputs the first row of pixel data to a row of pixels 14. In some embodiments, the input pixel data rate is less than the output pixel data rate so that each pixel cluster 20 of two or more pixel clusters 20 receives the second row of pixel data at the same time as each pixel cluster 20 outputs two or more rows of pixel data.

Embodiments of the present disclosure provide reduced memory requirements for decoupled input and output pixel control methods. Conventional methods, such as double-buffering, require twice the memory to decouple the input and output data rates so that a display can, for example, load an image at the same time as it displays an image. Thus, for such a conventional system, the amount of memory can be 2N rows of pixel data whereas embodiments of the present disclosure only require N+1 rows of pixel data. For example, in an embodiment in which N=4 (each cluster 20 comprises four rows of pixels 14), a conventional double buffered memory design would require memory storage for eight rows of pixels 14. In contrast, embodiments of the present disclosure require N+1 rows of memory storage or five rows of pixels 14, a reduction in memory requirements of 37.5%. If N=8, embodiments of the present disclosure requires nine rows instead of sixteen rows, a savings of nearly 43.75%.

Figure 3:
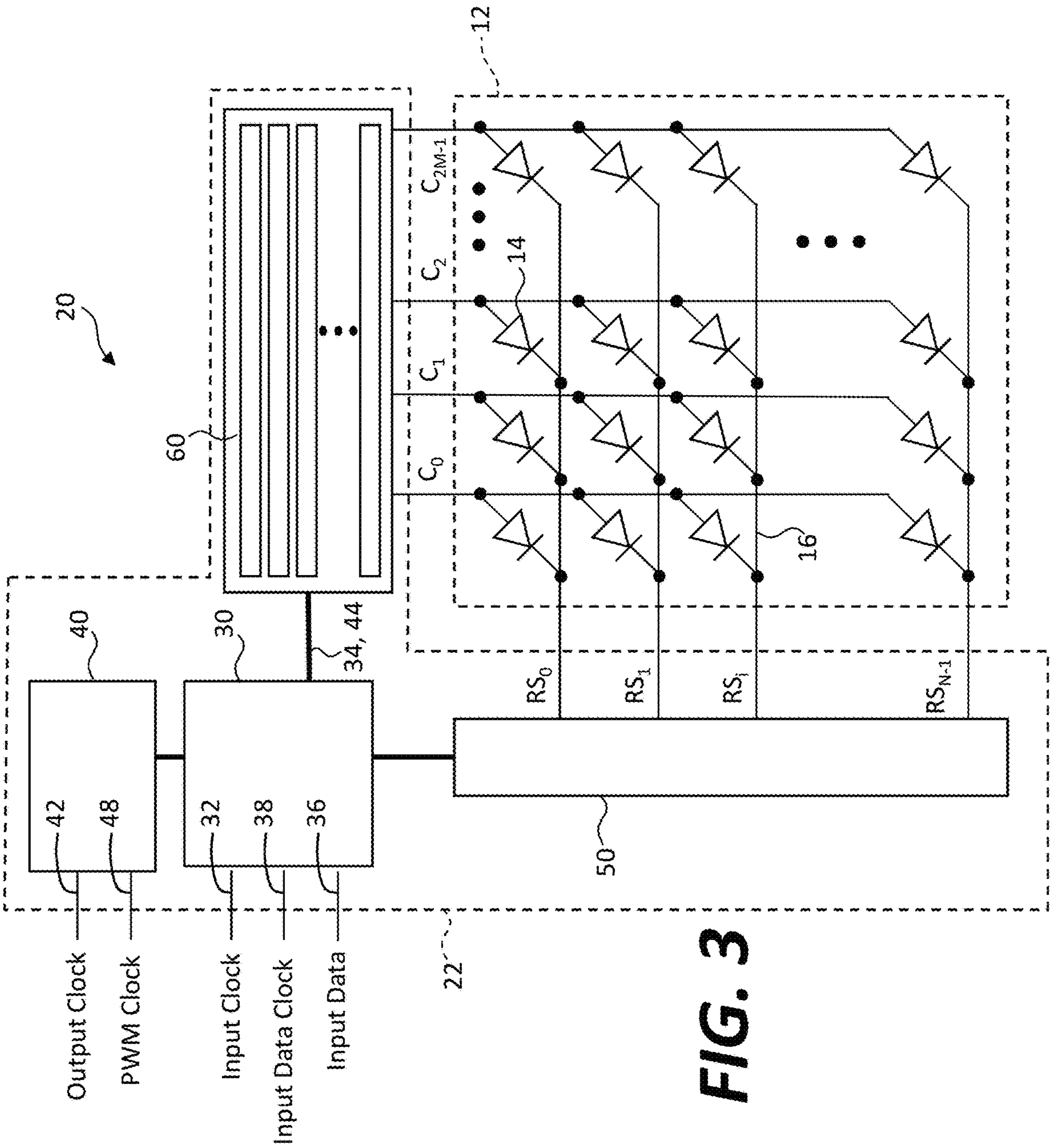
FIG. 3 is a simplified schematic circuit diagram of a pixel cluster according to illustrative embodiments of the present disclosure.

As illustrated in FIGS. 1-3, a display 90 comprises pixel clusters 20 with memory banks 60, a load-select circuit 30, a bank-select circuit 40, and a row-select circuit 50. Load-select circuit 30 receives an input clock 32 and provides an enable load-select signal 34 for memory bank 60 into which input data 36 (input pixel data) is loaded, labelled $LD_x$ 34 (e.g., load data row 0, load data row 1, to load data row N where the subscript number X specifies memory bank 60 receiving the input pixel data). Bank-select circuit 40 receives an output clock 42 and provides an enable bank-select signal 44 for memory bank 60 from which data is output (output pixel data) to pixels 14, labelled $BS_x$ 44 (e.g., bank-select row 0, bank-select row 1, to bank-select N where the subscript number specifies memory bank 60 from which pixel data is output). According to embodiments, a load select ($LD_x$ 34) row cannot be the same as a bank-select row ($BS_y$ 44), that is x cannot equal y, at a given time pixel data is input or output. Row-select circuit 50 selects the row of pixels 14 that are provided with pixel data from memory banks 60, for example in a passive-matrix control scheme. For example, row-select circuit 50 can provide, through a demultiplexer, a power or ground signal that enables current corresponding to pixel data output from a selected memory bank 60 to flow through the corresponding row of pixels 14. (The connections from load-select circuit 30, bank-select circuit 40, and row-select circuit 50 to memory banks 60 are shown with a heavy line to indicate a bus; the LD 34 and BS 44 signals are separate signals that are not connected together.

In operation, input data 36 is received according to input clock 32 and load-select circuit 30 selects an input memory bank 60 that receives input data 36. At the same time, bank-select circuit 40 receives output clock 42 and selects an output memory bank 60 to output columns of pixel data that are received by a row of pixels 14 selected by row-select circuit 50. The input memory bank 60 and the output memory banks 60 are different memory banks 60 at any given pixel-data input or output time. Output clock 42 can have a greater frequency than input clock 32 so that, for example, output pixel data from output memory banks 60 are cycled through one or more times while input memory bank 60 receives input data 36. For example, a row of input data 36 can be received at 60 or 120 Hz and rows of output pixel data can be output to pixels 14 at 240, 480, or 960 Hz.

Input clock 32 and output clock 42 can each cycle once for each row of pixel data input and output, respectively, or can be derived from an input pixel data clock and an output pixel data clock that cycles once per pixel value or light-emitter value. (To simplify, the figures do not illustrate pixels 14 with multiple light emitters 14, for example a light emitter 14 for each color, such as a red, green, and blue light emitter 14, but memory banks 60 can each comprise storage for multiple colored light emitters 14 or entire memory banks 60 can be replicated and similarly controlled to provide a color display 90.)

As illustrated in FIG. 3, cluster controller 22 can comprise a load-select circuit 30 that receives an input clock 32 (e.g., an input row clock), input data 36 (e.g., input pixel data), and an input data clock 38, a bank-select circuit 40 that receives an output clock 42 (e.g., an output row clock) and an output data clock 48 (that can be a pulse-width-modulation clock 48 with cycles corresponding to each bit of pixel data), a row-select circuit 50 that selects the row of light emitters 14 that emit light, and memory banks 60 (here illustrated as one large memory bank 60 but comprising storage for N rows of pixel data) that each store pixel data for a corresponding row of pixels 14. Pixel data can be digital values, each corresponding to the desired light output from a light emitter 14, for example an eight-bit value, a twelve-bit value, or a sixteen-bit value. The light output can be controlled using pulse-width-modulation (PWM) temporal control responsive to PWM clock 48 (e.g., an output data clock). In some embodiments, other luminance-control methods are used, for example amplitude modulation provided through an analog-to-digital converter (not shown) or using analog storage (e.g., a capacitor array) in memory banks 60.

Figure 4A:
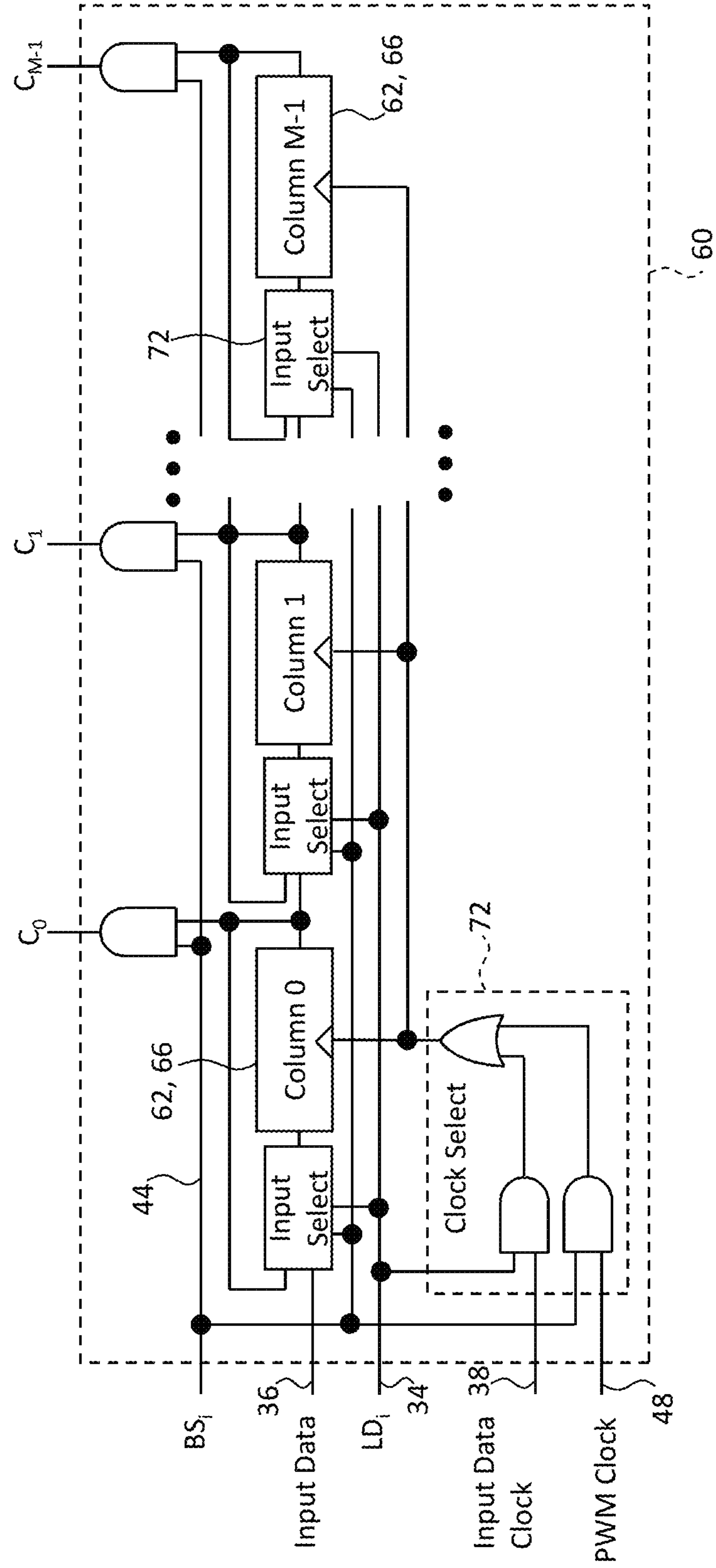
FIG. 4A is a schematic circuit diagram of a bank comprising serial shift registers according to illustrative embodiments of the present disclosure.

FIG. 4A illustrates a memory bank 60 comprising M column memories 62 (e.g., flip flops or latches 66), where M is the number of columns of pixels 14 in array 12. Column memories 62 each store a pixel value, for example 8, 12, or 16 bits and are serially loaded. In some embodiments and as illustrated in the Figures, column memories 62 are serially connected serial registers. The input to each column memory 62 is controlled by an input select circuit 72 controlled by LD 34 that selects between external input data 36 and an internal output of the column memory 62 (e.g., to enable a recirculation of pixel data in column memory 62 so that as pixel data is shifted out of column memory 62 output for display to light emitters 14, it is also shifted back into column memory 62) when LD 34 or BS 44 are enabled, respectively. The clock for each column memory 62 is likewise selected with between the input and output data clocks 38, 48 with a clock select circuit 72 having similar logic to input select circuit 72. If neither LD 34 nor BS 44 is high (enabled) then a different memory bank 60 can input or output pixel data and bank 60 is quiescent. The present design is structured to reduce power and gate transitions when memory bank 60 is quiescent, reducing display 90 power usage. Memory banks 60 (or cluster controller 22) can comprise light emitter 14 drivers to provide suitable current to a row of light emitters 14 in response to pixel data output by a selected memory bank 60.

Figure 4B:
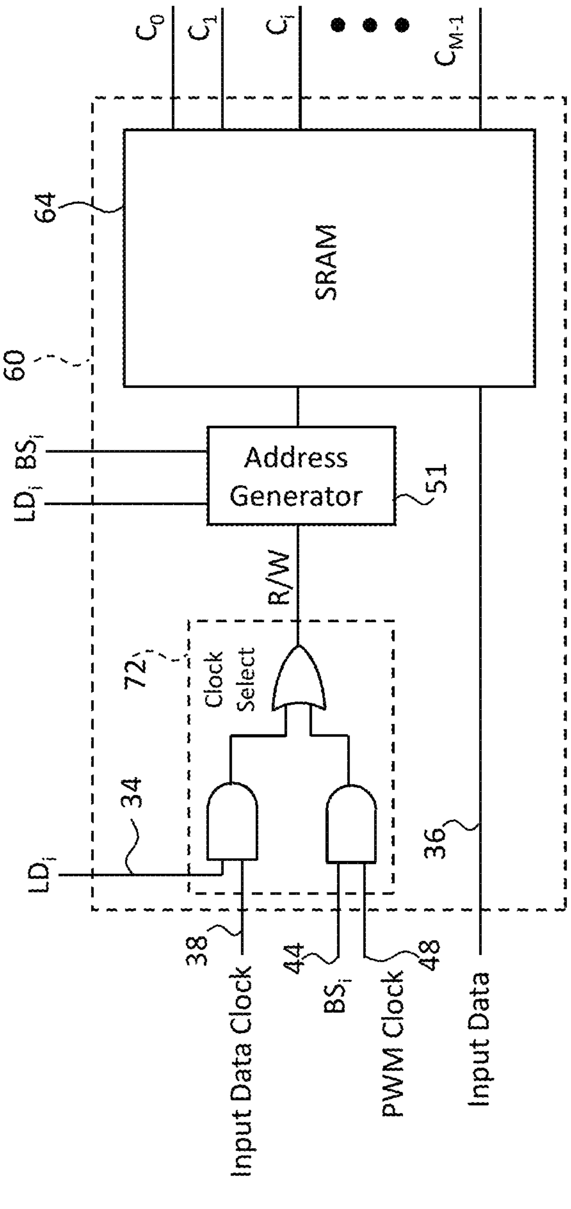
FIG. 4B is a schematic circuit diagram of a bank comprising an SRAM according to illustrative embodiments of the present disclosure.

FIG. 4B illustrates embodiments using an SRAM 64 rather than column memory 62 serial shift registers to implement memory bank 60. The SRAM 64 read/write signal is derived from input data clock 38 or output data clock 48 (PWM clock 48) as in FIG. 4A to read or write data into or out of SRAM 64 at row addresses specified by address generator 51 in response to load-select and bank-select signals 34, 44. SRAM 64 outputs pixel data bits for columns of LEDs 14.

Figure 5:
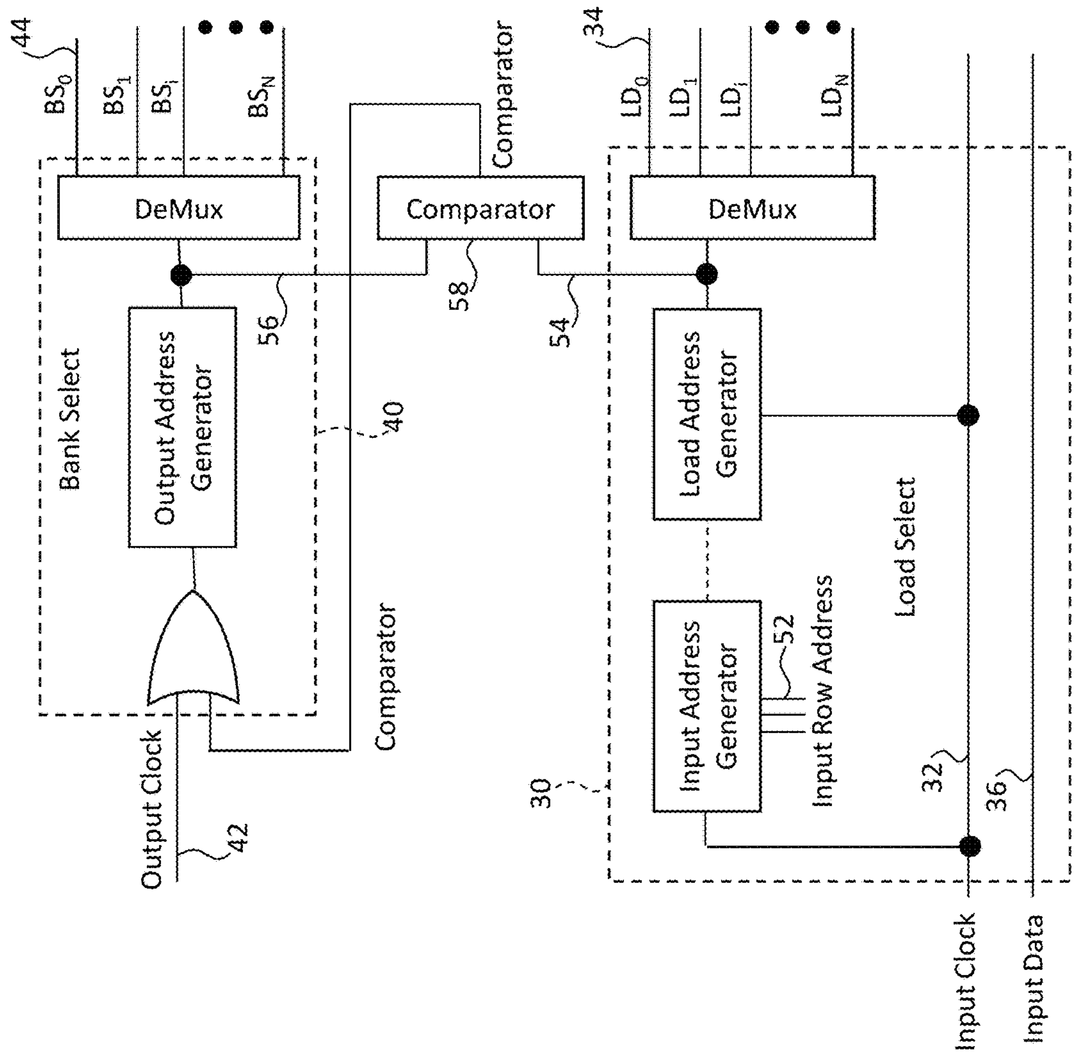
FIG. 5 is a schematic circuit diagram of a load-select circuit and a bank-select circuit according to illustrative embodiments of the present disclosure.

FIG. 5 illustrates embodiments of load-select circuit 30 and bank-select circuit 40. Load-select circuit 30 is responsive to input clock 32 to generate a load address LD 34. Depending on the protocol provided, input clock 32 generates an input row address 52 (input row number, e.g., 0–(N−1) or 0-3 for a four-row array 12 of pixels 14), for example with a counter that initializes to a zero address. Input clock 32 can also generate a corresponding input bank address 54 (for example with a counter that initializes to zero and counts from 0 to N or 0-4 for a four-row array 12 of pixels 14) that is demultiplexed to specify a load-select signal 34. Load-select signal 34 selects memory bank 60 that inputs pixel data on input data 36 line as described with respect to memory bank 60 and shown in FIGS. 4A and 4B. Memory banks 60 can be loaded with pixel data in the order that they are received in cluster 20.

Bank-select circuit 40 responsive to output clock 42 (specifying a change in output memory bank 60 output) can generate an output bank address 56 demultiplexed to provide the bank-select signal BS 44. Bank-select circuit 40 and load-select circuit 30 can operate independently and asynchronously. Therefore, if a memory bank 60 is receiving input data 36, it is not available to output data. Comparator 58 compares the input bank address 54 with the output bank address 56 and, if they are equal, increments output clock 42 to specify the next memory bank 60 in the sequence. Thus, output memory banks 60 will cycle in order from 0-N, skipping over input memory bank 60.

Figure 6:
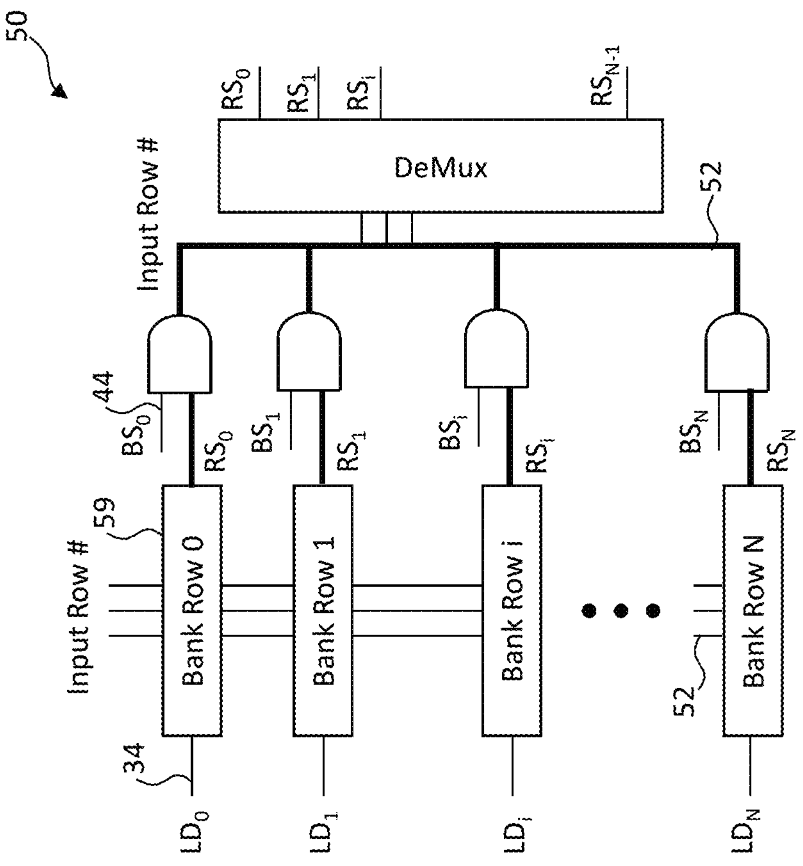
FIG. 6 is a schematic circuit diagram of a row-select circuit according to illustrative embodiments of the present disclosure.

FIG. 6 illustrates embodiments of row-select circuit 50. Row-select circuit 50 provides light-emitter drivers that serve to source or sink current specified by the column pixel data output from a selected memory bank 60 and can select any one of N rows (e.g., $RS_0$-$RS_{(N-1)}$ or 0-3 in a four-row array 12 of light emitters 14, in contrast to load-select circuit 30 and bank-select circuit 40 that select any one of (N+1) memory banks 60). Row-select circuit 50 comprises N input bank address registers 59 (e.g., a parallel in/parallel out shift register). Each input bank address register 59 stores the input bank row address associated with the pixel data in a memory bank 60. During operation, any memory bank 60 (e.g., controlled by BS) can at some time store any row of pixel data (e.g., specified by RS). For example, in a four-row array 12 of pixels 14, the first four rows of input pixel data (e.g., a first image frame) can be stored in memory banks 0, 1, 2, and 3, respectively, but the second four rows (e.g., a second image frame) can be stored in memory banks 60 in the order 4, 0, 1, 2 respectively. Input bank address register 59 associates the row address of pixel data with the memory bank 60 in which the pixel data is stored. As shown in FIG. 6, each time data is loaded into a memory bank 60 (with load-select signal LD 34), the corresponding input row address 52 is stored in a corresponding input bank address register 59. When a memory bank 60 is selected with bank-select signal BS 44, the corresponding input bank address register 59 is output to a demultiplexer that then selects and enables the corresponding row line.

Figure 8:
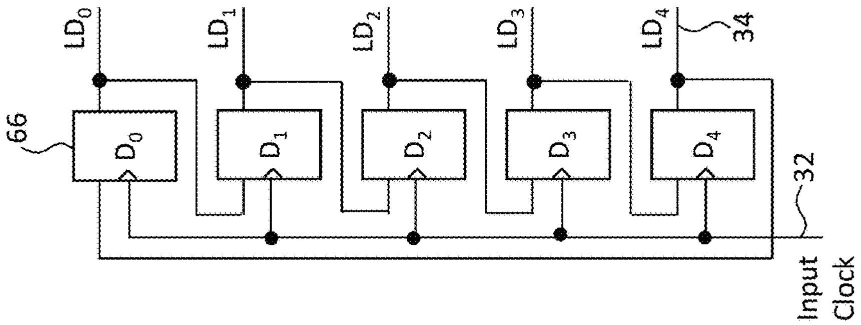
FIG. 8 is a schematic circuit diagram of a load address generator according to illustrative embodiments of the present disclosure.
Figure 7:
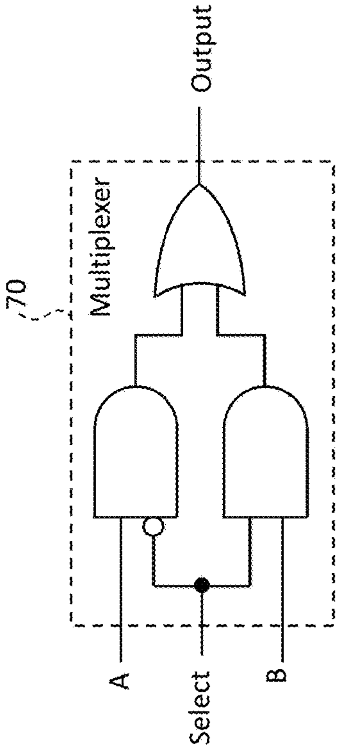
FIG. 7 is a schematic circuit diagram of a multiplexer according to illustrative embodiments of the present disclosure.
Figure 9:
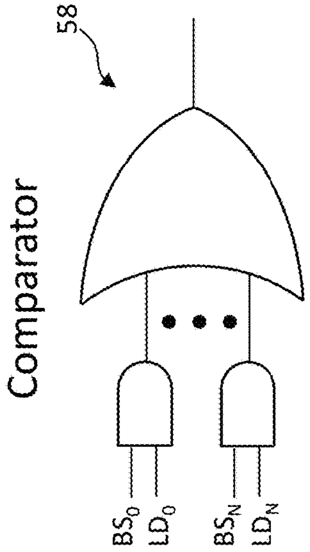
FIG. 9 is a schematic circuit diagram of a comparator according to illustrative embodiments of the present disclosure.

FIG. 7 illustrates the logic of a two-input multiplexer 70. FIG. 8 illustrates a load address generator comprising series-connected flip flops 66 (e.g., D flip flops or latches) that initializes to a single one value (e.g., $D_0$ initializes to a one value and the remainder initialize to a zero value) and then shifts the one value through the series connected flip flops 66 with each new input clock 32 cycle and input data 36. (Input data clock 38 corresponds to each data element (e.g., bit) in input data 36. Each time new input data for a row of pixels 14 is received, input clock 32 can cycle.) FIG. 9 illustrates a comparator 58 comprising AND gates responsive to LD and BS signals 34, 44. If any pair of LD and BS signals 34, 44 match, an output memory bank 60 and an input memory bank 60 are the same and one of them must change (e.g., bank-select signal 44 is incremented).

Figure 10:
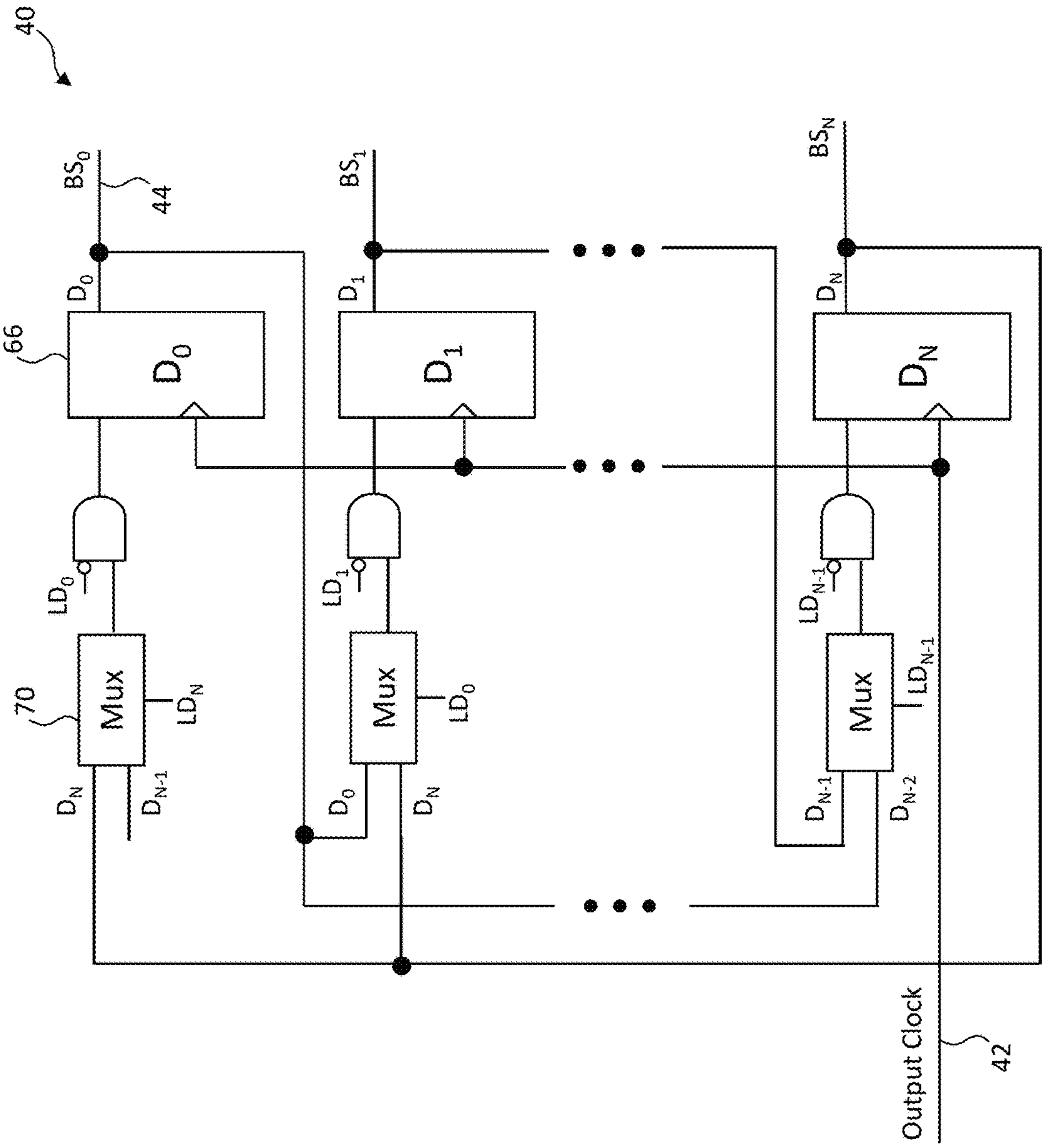
FIG. 10 is a schematic circuit diagram of a bank-select circuit according to illustrative embodiments of the present disclosure.
Figure 11:
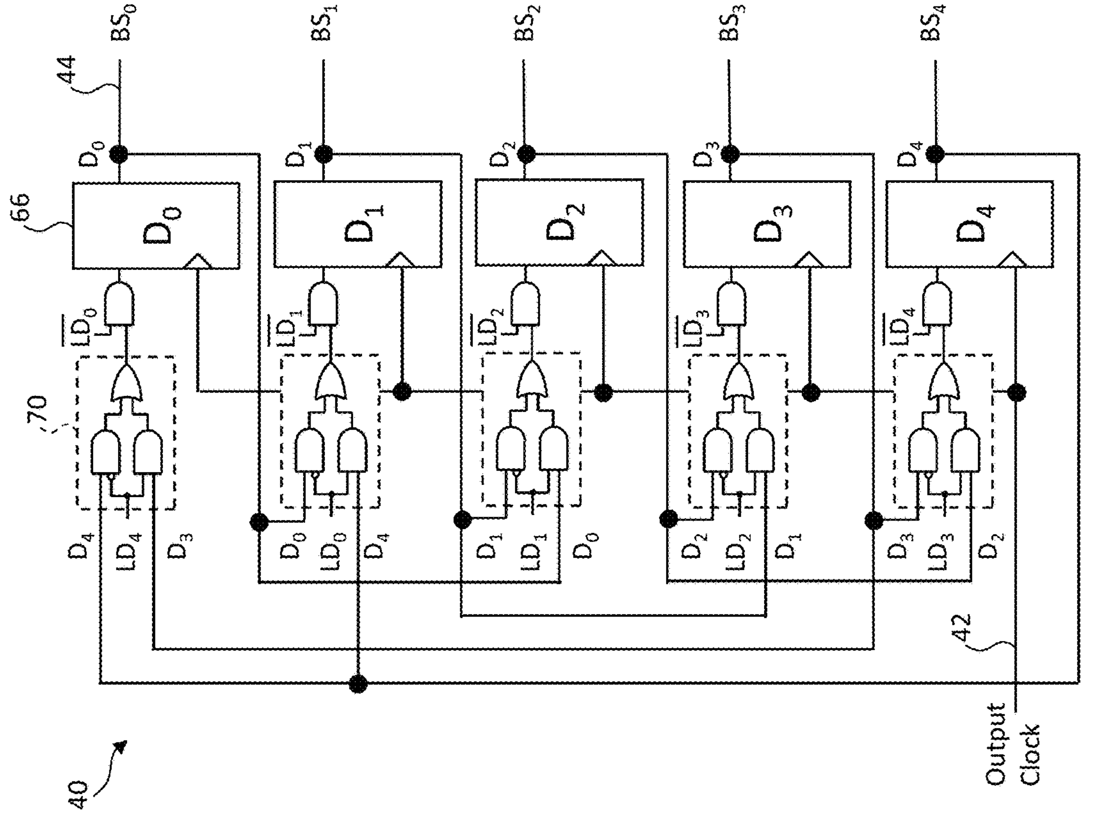
FIG. 11 is a schematic circuit diagram of a bank-select circuit for four banks according to illustrative embodiments of the present disclosure.

FIG. 10 illustrates generic embodiments of bank-select circuit 40. Bank-select circuit 40 can comprise series-connected flip flops 66 (e.g., D flip flops or latches forming a serial register) with one flip flop 66 initialized to one, such as $D_1$, (where $LD_0$ 34 is initialized to one) and the rest to zero. Each output of the serial register corresponds to the bank-select signal 44 of a corresponding bank 60. The one value propagates sequentially through the serial register selecting banks 60 in order except where the bank-select signal 44 equals the load-select signal 34, in which case the signal output from the prior flip flop 66 in the register is input, thus skipping over bank 60 that is selected by load-select signal 34. At the same time, the bank-select signal 44 corresponding to the load-select signal 34 is kept at a zero value with the input AND gate. In such embodiments, a separate comparator 58 (e.g., as shown in FIG. 5) is unnecessary. (For clarity, in the description that follows reference numerals are omitted for signals LD 34 and BS 44 where number subscripts are used.) For example, if $LD_0$ is high (input data 36 is loading into bank 0), $BS_0$ is kept low by the AND gate input to $D_0$ and $D_1$ receives an input from $D_N$ to circulate the bank-enable signal (the one value that circulates through $D_1$-$D_N$). If $LD_1$ is high (input data 36 is loading into bank 1, $BS_1$ is kept low by the AND gate input to $D_1$ and $D_2$ receives an input from $D_0$ to circulate the bank enable signal (the one value that circulates through $D_0$, $D_2$-$D_N$). Only one of $D_0$-$D_N$ can store a one value (so only one BS 44 can be enabled at a time) and it should not correspond to LD 34 (so a selected output memory bank 60 cannot be the input memory bank 60) and $BS_X$ 44 and $LD_Y$ 34 should be initialized so that they are not the same and X does not equal Y. For clarity, FIG. 11 illustrates the same structure with N=4 D flip flops 66.

Figure 12:
FIG. 12 shows successive rows of pixel data loaded into banks corresponding to FIGS. 10 and 11 according to illustrative embodiments of the present disclosure.

FIG. 12 shows an array of boxes that illustrate the data stored in memory banks 60 where N=4, starting with an initial input data 36 loaded into memory bank 60 (so that initially $LD_0$=1 and $LD_1$-$LD_4$=0 $BS_0$=0, $BS_1$=1, and $BS_2$-$BS_4$=0). Each column of boxes corresponds to a time or period during which a row is loaded (e.g., initially a first load cycle L=1 proceeds at time=0 in the left-most column of boxes in FIG. 12). Subsequent load cycles L proceed and are numbered with sequential columns to the right and then below. Each box corresponds to a memory bank 60 of the N+1 memory banks 60. The active LD signal 34 and active BS signals 44 are listed under each column of boxes. An X in a box represents unknown data. If the memory bank 60 corresponding to the box stores pixel data, it is labeled with the input row address 52 (row address RX) of the data in the corresponding memory bank 60. Input row address 52 is shown in bold font for input data 36 stored in a memory bank 60 and in regular font for data output from memory bank 60 for display with light emitters 14 in the corresponding row of array 12. The subscript of row number 52 in the box represents the frame or image data set loaded into the corresponding memory bank 60, beginning with frame A and proceeding alphabetically. In the following description, the reference numeral for memory banks 60 is omitted when referring to the number of a memory bank 60.

Thus, for load cycle one L=1, row zero of frame A ($R0_A$) is loaded into memory bank 0, the contents of the remaining memory banks 60 are unknown, $LD_0$ is enabled, and unknown (or initialized) pixel data can be output from memory banks 60 selected by $BS_1$-$BS_4$ (memory banks 60 numbered 1-4). For load cycle L=1, bank 0 stores $R0_A$ and bank 1 inputs row one of frame A ($R1_A$), the remainder of memory banks 60 are unknown, $LD_1$ is enabled, and pixel data can be output from memory banks 60 selected by $BS_0$, $BS_2$-$BS_4$ (memory banks 60 numbered 0, 2-4). Input data 36 is subsequently stored for load cycles 3 and 4 after which the first four rows of frame A are stored in corresponding banks 0-3 (L=4). A second image frame B is then input and the first row of input data 36 is input into bank 4 so that $LD_4$ is enabled and pixel data is output from banks 0-3 so that $BS_0$-$BS_3$ are sequentially and cyclically active, displaying the pixel data for image frame A. The process continues for five image frames (frames A-E) until the sixth image frame F begins the entire process over again.

Figure 13:
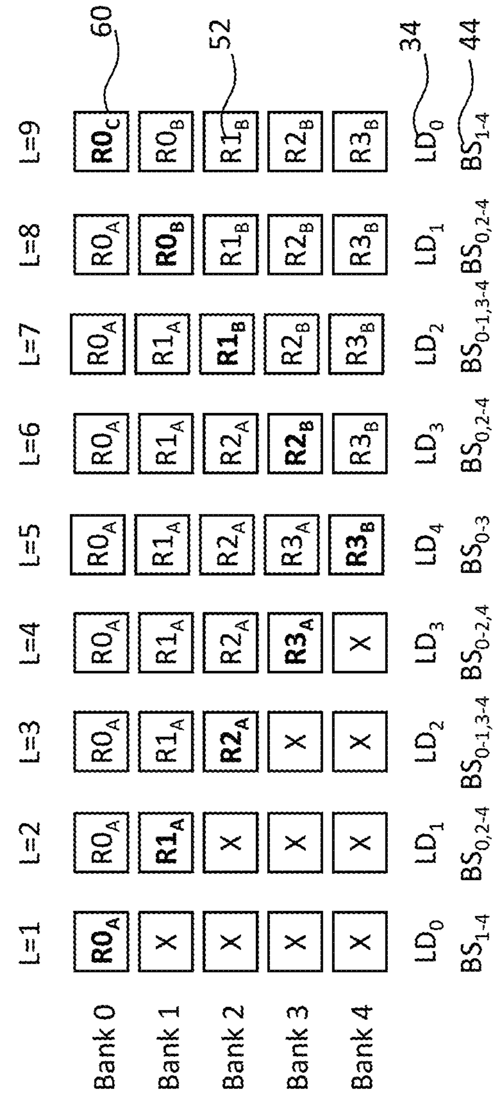
FIG. 13 shows successive rows of pixel data loaded into banks according to illustrative embodiments of the present disclosure.

The input logic in cluster controllers 22 can be simplified if the rows of input pixel data for each image frame are alternately reversed so that, for example, frame A is transmitted in the row order 0, 1, 2, and 3 (as described above) and then frame B is transmitted in the row order 3, 2, 1, and 0. Frame C is then transmitted in the same way as frame A and frame D in the same way as frame B. If input data 36 for each row is transmitted in this way, each row of data is only stored in one of two memory banks 60. For example, bank 0 stores only pixel data for row 0, bank 1 stores pixel data for either row 1 or row 0, bank 2 stores pixel data for only row 2 or row 1, bank 3 stores pixel data for only row 3 or row 2, and bank 4 stores pixel data for only row 4. FIG. 13 illustrates the row data stored in each memory bank 60 for two image frames A and B. Pixel data stored for image frame C then repeats the cycle. In FIG. 13, load cycles L=1 to L=5 are identical with those in FIG. 12 and store the rows of pixel data in memory banks 60 numbered 0-3 but then banks are selected in the opposite order for load cycles L=6 to L=8 to store the rows of pixel data in memory banks 60 numbered 4-1. Load cycle L=9 is the same as load cycle L=1, except that frame C is loaded.

Figure 14:
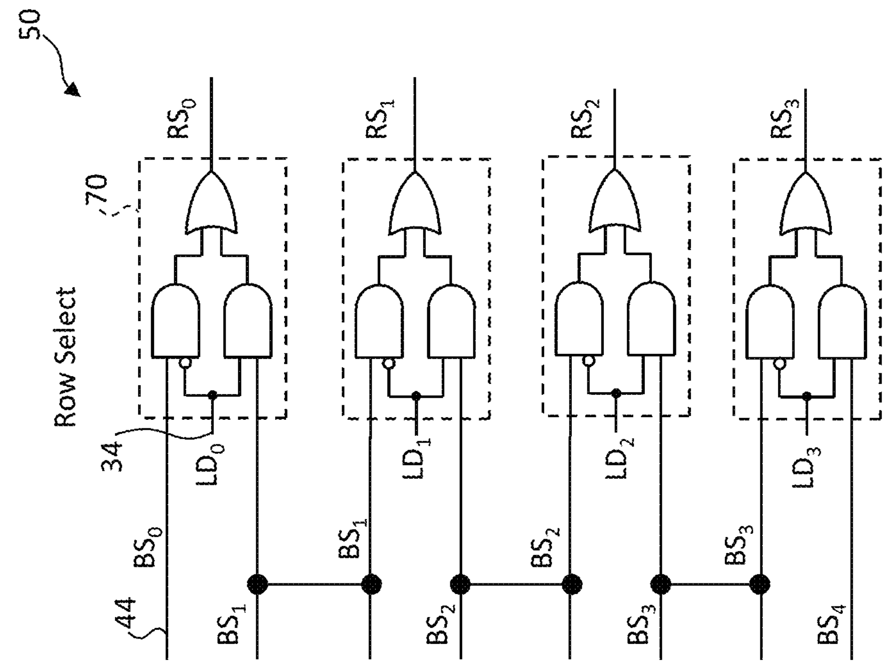
FIG. 14 is a schematic circuit diagram of a row-select circuit corresponding to FIG. 13 according to illustrative embodiments of the present disclosure.

In some such embodiments and as illustrated in FIG. 14 for N=4, row-select circuit 50 is simplified and does not require storing a row address for each memory bank 60 as in FIG. 6. Instead, each row-select signal can be derived from the LD 34 and BS 44 signals. If LD 34 is high for a memory bank 60 (the corresponding memory bank 60 is being loaded), then the row-select signal is enabled only when BS 44 for the remaining memory banks 60 are sequentially enabled. For example, if $LD_0$ is enabled, the row 0 select signal is only active when $BS_1$ is active and data is sequentially output from banks 1-4 in response to $BS_1$-$BS_4$. If $LD_1$ is enabled, the row 0 select signal is only active when $BS_0$ is active and data is sequentially output from banks 0, 2-4 in response to $BS_0$ and $BS_2$-$BS_4$. Thus, in embodiments of the present disclosure, display controller 80 provides rows of pixel data for sequential image frames to one or more pixel clusters 20 in alternating forward and reverse row orders.

Those knowledgeable in digital circuit design will understand that different circuits can implement the memory architecture of display 90 and that embodiments of the present disclosure are not limited to the specific designs shown here. The specific designs are illustrative only, are provided to aid in understanding embodiments of the present disclosure, and are not necessarily complete or include all of the circuits necessary to provide timing and circuit control for clusters 20. To the extent elements are omitted, those of ordinary skill will appreciate that those elements are described in the art and can readily be incorporated with circuit designs, or portions thereof, disclosed herein.

Display substrate 10 can be any useful substrate on which light emitters 14 and column-data lines 82C and row-select lines 82R can be suitably disposed, for example glass, plastic, resin, fiberglass, semiconductor, ceramic, quartz, sapphire, or other substrates found in the display or integrated circuit industries. Display substrate 10 can be flexible or rigid and can be substantially flat. Column-data lines 82C and row-select lines 82R can be wires (e.g., photolithographically defined electrical conductors such as metal lines)

disposed on display substrate 10 that conduct electrical current from column controller 80C to columns of clusters 20 and electrical current from row controller 80R to rows of clusters 20.

Column controller 80C can be, for example, an integrated circuit that provides control, timing (e.g., clocks) or data signals (e.g., column-data signals) through column-data lines 82C to columns of clusters 20 to enable light emitters 14 to control light in display 90. Each column-data line 82C can be electrically separate and optionally independently controlled from every other column-data line 82C by column controller 80C. Column controller 80C can comprise a single integrated circuit or can comprise multiple integrated circuits, e.g., electrically connected integrated circuits. The integrated circuit(s) can be micro-transfer printed as unpackaged dies and can comprise fractured or separated tether(s).

Row controller 80R can be, for example, an integrated circuit that provides control signals (e.g., row-select signals) and/or timing signals (e.g., clocks or timing signals such as pulse-width modulation (PWM) signals) through row-select lines 82R to rows of clusters 20 to cause light emitters 14 to control light in display 90. Each row-select line 82R can be electrically separate and optionally independently controlled from every other row-select line 82R by row controller 80R. Row controller 80R can comprise a single integrated circuit or can comprise multiple integrated circuits, e.g., electrically connected integrated circuits. The integrated circuit(s) can be micro-transfer printed as unpackaged dies and can comprise fractured or separated tether(s).

Pixels 14 can comprise one or multiple light emitters 14, such as light-emitting diodes 14. For simplicity of exposition and illustration, pixels 14 and light emitters 14 are not distinguished herein. In some embodiments, light emitters 14 can comprise light-emitting diodes 14, e.g., inorganic light-emitting diodes 14 such as horizontal inorganic light-emitting 14 or vertical inorganic light-emitting diodes 14. Inorganic light-emitting diodes 14 can have a small area, for example having a length and a width each no greater than 5 microns, no greater than 10 microns, no greater than 20 microns, no greater than 50 microns, no greater than 100 microns, no greater than 200 microns, or no greater than 500 microns. Inorganic light-emitting diodes 14 can have a small thickness, for example having a thickness no greater than 50 microns, no greater than 20 microns, no greater than 10 microns, no greater than 5 microns, or no greater than 2 microns. Such small light emitters 14 leave additional area on display substrate 10 for more or larger wires, e.g., column-data lines 82C, row-select line 82R or ground and power wires, or circuits, e.g., cluster controllers 22.

Pixels 14 can comprise a red light-emitting diode 14 that emits red light, a green light-emitting diode 14 that emits green light, and a blue light-emitting diode 14 that emits blue light (collectively light-emitting diodes 14 or LEDs 14) under the control of cluster controller 22. In certain embodiments, light emitters 14 that emit light of other color(s) are included in pixel 14, such as a yellow light-emitting diode 14. Light-emitting diodes 14 can be mini-LEDs (e.g., having a largest dimension no greater than 500 microns) or micro-LEDs (e.g., having a largest dimension of no greater than 100 microns). Pixels 14 can emit one color of light or white light (e.g., as in a black-and-white display 90) or multiple colors of light (e.g., red, green, and blue light as in a color display). Clusters 20 can comprise multiple elements disposed and electrically connected directly on display substrate 10 or can comprise multiple elements disposed and electrically connected on a cluster substrate separate and independent from display substrate 10 with the cluster substrate disposed on display substrate 10. Cluster controller 22 can comprise one or more integrated circuits, for example one or more micro-devices. Any one or more of cluster controller 22 and LEDs 14 can be micro-transfer printed onto display substrate 10 or onto a cluster substrate. A cluster substrate can be micro-transfer printed from a pixel source substrate onto display substrate 10 and electrically connected to control signal wires (e.g., row-control lines 82R, column-data line 82C, power, and ground signal wires) on display substrate 10. Micro-transfer printed devices or structures (e.g., LEDs 14 cluster controllers 22, or cluster substrates) can comprise broken (e.g., fractured) or separated tether(s) as a consequence of micro-transfer printing from a source to a target substrate.

According to some embodiments of the present disclosure, a cluster controller 22 receives column-data signals from column controller 80C through column-data line 82C and row-select signals from row controller 80R through row-select line 82R. When a cluster 20 is selected by a row-select signal on row-select line 82R, input data 36 received on column-data line 82C can be stored in memory banks 60 at the same time as cluster controller 22 outputs pixel data from memory banks 60 to light emitters 14 to emit light. Cluster controllers 22 can be thin-film circuits. According to some embodiments of the present disclosure, cluster controllers 22 comprise integrated circuits formed in a crystalline semiconductor (e.g., silicon) substrate that are transferred from a native source wafer to non-native display substrate 10 or to a non-native cluster substrate, for example by micro-transfer printing. As a consequence of micro-transfer printing, cluster controller 22 can comprise a fractured or separated controller tether. Such crystalline circuits have much better performance and a smaller size than thin-film semiconductor circuits. The smaller size of cluster controller 22 provides additional area over display substrate 10 for larger column-data lines 82C, row-select lines 82R, or circuits such as load-select circuit 30, bank-select circuit 40, memory banks 60, or row-select circuit 50, enabling embodiments of the present disclosure.

According to some embodiments of the present disclosure, row controller 80R can provide timing signals to each cluster 20 in a row at the same time, for example row-select signals or pixel timing signals such as pulse-width modulation (PWM) signals.

According to some embodiments, each cluster 20 can comprise a pixel timing circuit that internally and independently generates a timing signal controlling the brightness of pixels 14, for example in combination with digital data values stored in memory banks 60. In some such embodiments, internally generated timing signals need not be provided by row controller 80R or column controller 80C, e.g., simplifying row controller 80R, and reducing the bandwidth and frequency requirements for row-select signals on row-select lines 82R or column-data signals on column-data lines 82C, as certain operations can instead be carried out locally in cluster controllers 22.

Embodiments illustrated in FIG. 1 comprise a row controller 80R. According to some embodiments of the present disclosure, display 90 does not comprise a row controller 80R. Functions performed by row controller 80R can be performed by column controller 80C that is appropriately electrically connected to clusters 20 and by circuits internal to each cluster 20, e.g., incorporated into cluster controller 22, for example including token-passing daisy-chained serially connected circuits or packet addressing, transmission, and reception circuits. Some such embodiments reduce the amount of circuitry and wires needed to control display 90.

Thus, embodiments of the present disclosure are useful for displays 90 having fewer integrated circuits, fewer wires, and fewer metal layers constructed at reduced expense. In some embodiments, display controller 80 includes (e.g., is comprised of) row controller 80R and column controller 80C. In some embodiments, display controller 80 controls cluster controllers 22 of pixel clusters 20 through separate row controller 80R and column controller 80C.

In a method according to some embodiments of the present disclosure, integrated circuits are disposed on display substrate 10 by micro transfer printing. In some methods, integrated circuits (or portions thereof) or LEDs 14 are disposed on a cluster substrate to form a heterogeneous pixel 14 or cluster 20 and cluster 20 on the cluster substrate is disposed on display substrate 10 using compound micro-assembly structures and methods, for example as described in U.S. patent application Ser. No. 14/822,868 filed Aug. 10, 2015, entitled Compound Micro-Assembly Strategies and Devices, the disclosure of which is hereby incorporated by reference. However, since clusters 20 can be larger than the integrated circuits included therein, in some methods of the present disclosure, clusters 20 are disposed on display substrate 10 using pick-and-place methods found in the printed-circuit board industry, for example using vacuum grippers. Circuits and light-emitters 14 in a cluster 20 can be interconnected on display substrate 10 using photolithographic methods and materials or printed circuit board methods and materials. Circuits and light-emitters 14 in a cluster 20 can be interconnected on a cluster substrate using photolithographic methods and materials. Clusters 20 can be interconnected on display substrate 10 using photolithographic methods and materials or printed circuit board methods and materials.

In certain embodiments, display substrate 10 includes material, for example glass or plastic, different from a material in an integrated-circuit substrate, for example a semiconductor material such as silicon or GaN. Light emitters 14 can be formed separately on separate semiconductor substrates, assembled onto cluster substrates (e.g., semiconductor substrates on or in which cluster controllers 22, or portion(s) or element(s) thereof, can be natively constructed to form clusters 20 and then the assembled units are located on the surface of the display substrate 10. This arrangement has the advantage that the integrated circuits or clusters 20 can be separately tested on a cluster substrate and the cluster modules accepted, repaired, or discarded before clusters 20 are located on display substrate 10, thus improving yields and reducing costs.

In some embodiments, elements of a pixel cluster 20 (e.g., pixels 14, cluster controller 22, memory banks 60, or a combination thereof) are disposed on or in a cluster substrate. In some embodiments, cluster controller 22, memory banks 60, or both are formed in a cluster substrate, for example a semiconductor substrate. In some embodiments, cluster controller 22, memory banks 60, or both are formed (e.g., lithographically patterned and native to) in a semiconductor substrate that is a cluster substrate. In some embodiments, cluster controller 22, memory banks 60, or both (e.g., when cluster controller 22 comprises memory banks 60) are transferred (e.g., micro-transfer printed) and are non-native to a cluster substrate. Pixels 14 can be transferred (e.g., micro-transfer printed) to a cluster substrate and electrically connected to cluster controller 22 and memory banks 60 disposed on or in the cluster substrate to form a pixel cluster 20. In some embodiments, pixel clusters 20 that include a cluster substrate are transferred (e.g., micro-transfer printed) to a display substrate 10 to form (e.g., thereby forming) a display 90.

In some embodiments of the present disclosure, providing display 90, display substrate 10, or clusters 20 can include forming conductive wires (e.g., row-select lines 82R and column-data lines 82C) on display substrate 10 or a cluster substrate by using photolithographic and display substrate 10 processing techniques, for example photolithographic processes employing metal or metal oxide deposition using evaporation or sputtering, curable resin coatings (e.g. SU-8), positive or negative photo-resist coating, radiation (e.g. ultraviolet radiation) exposure through a patterned mask, and etching methods to form patterned metal structures, vias, insulating layers, and electrical interconnections. Inkjet and screen-printing deposition processes and materials can be used to form patterned conductors or other electrical elements. The electrical interconnections, or wires, can be fine interconnections, for example having a width of less than fifty microns, less than twenty microns, less than ten microns, less than five microns, less than two microns, or less than one micron. Such fine interconnections are useful for interconnecting micro-integrated circuits, for example as bare dies with contact pads and used with the cluster substrates. Alternatively, wires can include one or more crude lithography interconnections having a width from 2 μm to 2 mm, wherein each crude lithography interconnection electrically interconnects pixels 14 on display substrate 10. For example, electrical interconnections can be formed with fine interconnections (e.g., relatively small high-resolution interconnections) while column-data lines 82C and/or row-select lines 82R are formed with crude interconnections (e.g., relatively large low-resolution interconnections).

In some embodiments, red, green, and blue LEDs 14 (e.g. micro-LEDs 14) or integrated circuits forming cluster controllers 22 are micro-transfer printed to cluster substrates or display substrate 10 in one or more transfers and can comprise fractured or separated tethers as a consequence of micro-transfer printing. For a discussion of micro-transfer printing techniques that can be used or adapted for use in methods disclosed herein, see U.S. Pat. Nos. 8,722,458, 7,622,367 and 8,506,867, each of which is hereby incorporated by reference in its entirety. The transferred light emitters 14 are then interconnected, for example with conductive wires and optionally including connection pads and other electrical connection structures, to enable a controller (e.g., cluster controller 22) to electrically interact with light-controlling elements 14 to emit, or otherwise control, light.

According to various embodiments, flat-panel display 90 can include a variety of designs having a variety of resolutions, light emitter sizes, and displays 90 having a range of display substrate 10 areas. Light emitters 14 of display 90 can be arranged in a regular array 12 (e.g., as shown in FIG. 2) or an irregular array 12 on or over display substrate 10.

In some embodiments, LEDs 14 are formed in substrates or on supports separate from display substrate 10. For example, LEDs 14 are formed in a semiconductor wafer. Cluster controller 22 can be formed in a semiconductor wafer. Memory banks 60 can also be formed in a semiconductor wafer. LEDS 14, cluster controllers 22, or memory banks 60 are then removed from the wafer and transferred, for example using micro-transfer printing, to display substrate 10 or a cluster substrate. Such arrangements have the advantage of using a crystalline semiconductor substrate that provides higher-performance integrated circuit components than can be made in the amorphous or polysilicon semiconductor available in thin-film circuits on a large substrate such as display substrate 10. Such micro-transferred LEDs 50, cluster controllers 22, or memory banks 60 can each individually and independently comprise a broken (e.g., fractured) or separated tether as a consequence of a micro-transfer printing process. By employing a multi-step transfer or assembly process, increased yields are achieved and thus reduced costs for flat-panel displays 90 of the present disclosure. Additional details useful in understanding and performing aspects of the present disclosure are described in U.S. patent application Ser. No. 14/743,981, filed Jun. 18, 2015, entitled Micro Assembled Micro LED Displays and Lighting Elements, the disclosure of which is hereby incorporated by reference herein in its entirety.

As is understood by those skilled in the art, the terms "over", "under", "above", "below", "beneath", and "on" are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer there between.

As is also understood by those skilled in the art, the terms "column" and "row", "horizontal" and "vertical", and "x" and "y" are arbitrary designations that can be interchanged (unless otherwise clear from context).

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously. The disclosure has been described in detail with particular express reference to certain embodiments thereof, but it will be understood that variations and modifications can be effected within the spirit and scope of the following claims.

PARTS LIST

10 display substrate
12 array
14 light emitter/pixel/light-emitting diode (LED)
15 cluster/pixel cluster
22 cluster controller
30 load-select circuit
32 input clock
34 load-select signal/LD
36 input data
38 input data clock
40 bank-select circuit
42 output clock
44 bank-select signal/BS
48 output data clock/PWM clock
50 row-select circuit
51 address generator
52 input row address
54 input bank address
56 output bank address
58 comparator
59 input bank address register
60 bank/memory bank
62 column memory
64 SRAM
66 latch/flip flop
70 multiplexer
72 select circuit
80 display controller
80C column controller
80R row controller
82C column wire/column-data lines
82R row wire/row-select lines
90 display

What is claimed:

1. A pixel cluster, comprising:

pixels disposed in an array of N rows and M columns, wherein N is no less than two and M is no less than one;

exactly (N+1) memory banks, each of the (N+1) memory banks operable to store pixel data for a row of the pixels; and a cluster controller operable to control the pixels and the (N+1) memory banks to (i) input pixel data for a row of the pixels and store the pixel data in an input memory bank of the (N+1) memory banks and (ii) output stored pixel data from one or more output memory banks of the (N+1) memory banks that are not the input memory bank to control corresponding one or more rows of the pixels.

2. The pixel cluster of claim 1, wherein the cluster controller is operable to input pixel data at the same time as output stored pixel data.

3. The pixel cluster of claim 1, comprising a cluster substrate, wherein the pixels are disposed on the cluster substrate and the (N+1) memory banks and the cluster controller are each independently disposed on or in the cluster substrate.

4. The pixel cluster of claim 3, wherein the cluster substrate is a semiconductor substrate and at least one of the (N+1) memory banks, the cluster controller, or at least one of the (N+1) memory banks and the cluster controller is disposed in the cluster substrate.

5. A display comprising pixel clusters each according to claim 3, wherein the pixel clusters are disposed in an array on a display substrate.

6. A method of controlling a display comprising an array of pixel clusters, each of the pixel clusters comprising (i) pixels disposed in an array of N rows of pixels and M columns of pixels and (ii) a cluster controller, wherein N is no less than two and M is no less than one, the method comprising:

providing first row pixel data to each of the pixel clusters in the array of pixel clusters;

for each of the pixel clusters, outputting, by the cluster controller, the first row pixel data to a first row of the rows of pixels; and providing second row pixel data to each of the pixel clusters, wherein at least one of the pixel clusters receives the second row pixel data at a same time as the cluster controller of the at least one of the pixel clusters outputs the first row of pixel data and wherein the at least one of the pixel clusters comprises exactly (N+1) memory banks, each of the (N+1) memory banks operable to store and output pixel data for a row of the pixels.

7. The method of claim 6, wherein each pixel cluster of two or more pixel clusters receives the second row of pixel data at a same time as the cluster controller of each of the two or more pixel clusters outputs two or more rows of pixel data.

8. An active-matrix display, comprising:

pixel clusters, each of the pixel clusters comprising (i) pixels disposed in an array of N rows and M columns, wherein N is no less than two and M is no less than one, (ii) at least (N+1) and fewer than 2N memory banks, each of the memory banks operable to store pixel data for a row of the pixels, and (iii) a cluster controller operable to control the pixels and the memory banks; and a display controller operable to provide pixel data to the cluster controller of each of the pixel clusters, wherein, for each of the pixel clusters, the cluster controller is operable to (i) input pixel data for a row of the pixels and store the pixel data in an input memory bank of the memory banks and (ii) output stored pixel data from one or more output memory banks of the memory banks that are not the input memory bank to control corresponding one or more rows of the pixels.

9. The active-matrix display of claim 8, wherein the display controller provides active-matrix control to the pixel clusters.

10. The active-matrix display of claim 8, wherein the pixels are passive-matrix pixels and, for each of the pixel clusters, the cluster controller provides passive-matrix control to the passive-matrix pixels in the pixel cluster.

11. The active-matrix display of claim 8, wherein, for each of the pixel clusters, the pixels are adjacent to each other so that no pixel from any other pixel cluster is disposed between the pixels in the pixel cluster.

12. The active-matrix display of claim 8, wherein, for each of the pixel clusters, the cluster controller is operable to successively output stored pixel data from two or more output memory banks of the memory banks.

13. The active-matrix display of claim 8, wherein, for each of the pixel clusters, the cluster controller is operable to input pixel data at an input rate and output pixel data at an output rate.

14. The active-matrix display of claim 13, wherein the output rate is greater than the input rate.

15. The active-matrix display of claim 8, wherein the display controller provides pixel data to the pixel clusters at irregular intervals.

16. The active-matrix display of claim 8, wherein, for each of the pixel clusters, the cluster controller controls the pixels without a blanking interval.

17. The active-matrix display of claim 8, wherein, for each of the pixel clusters, the cluster controller controls the pixels independently of any other pixel cluster.

18. The active-matrix display of claim 8, wherein the display controller provides rows of pixel data for sequential image frames to one or more of the pixel clusters in alternating forward and reverse row orders.

19. The active-matrix display of claim 8, wherein the pixel data is digital data.

20. The active-matrix display of claim 8, wherein, for each of the pixel clusters, the cluster controller controls the pixels with pulse width modulation.

21. The active-matrix display of claim 8, wherein, for each of the pixel clusters, the pixels comprise light emitters that are inorganic micro-light-emitting diodes.

22. The active-matrix display of claim 8, wherein, for each of the pixel clusters, the memory banks comprise one or more shift registers or one or more SRAMs or DRAMs.

23. The active-matrix display of claim 8, wherein, for each of the pixel clusters, each of the pixels comprises one or more inorganic micro-light-emitting-diodes and each of the one or more inorganic micro-light-emitting-diodes has a length and a width each no greater than 100 microns.

24. The active-matrix display of claim 8, wherein, for each of the pixel clusters, the cluster controller comprises the memory banks.

25. The active-matrix display of claim 8, wherein, for each of the pixel clusters, the cluster controller comprises a load-select circuit, a bank-select circuit, and a row-select circuit.

26. The pixel cluster of claim 1, wherein N is no less than 3.

* * * * *